June 9, 1964 — D. J. LE VINE — 3,136,946
MICROWAVE RESISTANCE MEASURING SYSTEM INCLUDING THERMOPLASTIC MICROSTRIP COUPLER
Filed Sept. 29, 1960 — 2 Sheets-Sheet 1

ACTIVE LINE
(EXPOSED TO SAMPLE)

INVENTOR.
DONALD J. LEVINE
BY
ATTORNEY

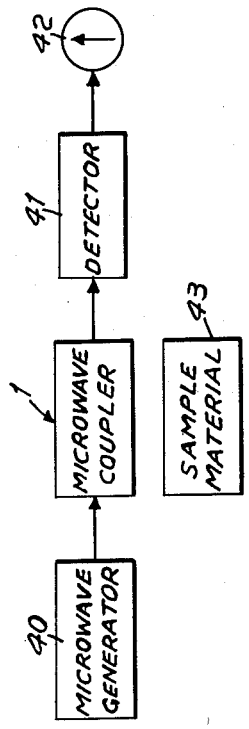
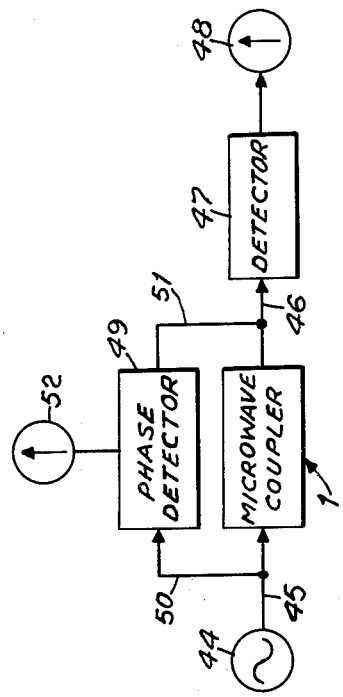
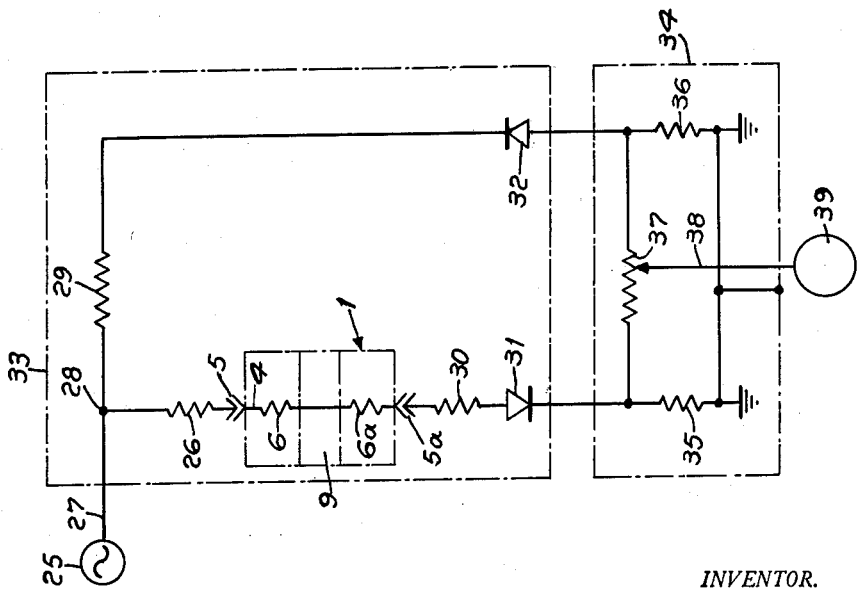

United States Patent Office 3,136,946
Patented June 9, 1964

3,136,946
MICROWAVE RESISTANCE MEASURING SYSTEM INCLUDING THERMOPLASTIC MICROSTRIP COUPLER
Donald J. Le Vine, Fair Lawn, N.J., assignor to International Telephone and Telegraph Corporation, Nutley, N.J., a corporation of Maryland
Filed Sept. 29, 1960, Ser. No. 59,285
8 Claims. (Cl. 324—58.5)

This invention relates to a resistance measuring system and more particularly to a microwave coupler for use with a resistance measuring system capable of testing surface portions of a material without thereby destroying the whole material.

For some applications, it is important to be able to detect relatively small changes in the properties of samples of resistance material used at microwave frequencies. The properties of interest of the sample material concerned consist of attenuation ($\alpha$) and phase velocity ($\beta$) constants so that the propagation constant ($\gamma$) is conventionally described as $\gamma = \alpha + j\beta$ where $j$ equals the square root of minus one ($\sqrt{-1}$). The present day method of determining the RF attenuation in a material involves preparing a small sample of the material and placing it in the testing equipment, using coaxial transmission line or hollow waveguide designed for testing. Thus, present day tests require a destructive testing process, since no method exists for testing the RF properties of portions of a whole body without removing those portions from the body. Determination of the RF attenuation of a material in place, such as the skin of an airplane is frequently desirable. Removing a sample from the surface of an airplane is not a satisfactory method of testing, since the removal is not only destructive to the airplane but also does not give a true indication of the RF attenuation of the material in place, nor does it indicate the uniformity or non-uniformity of the RF attenuation over the whole surface of the aircraft.

It is, therefore, an object of the present invention to provide a coupling device which can be used in a resistance measuring system and which can be moved adjacent to a relatively large body and used to determine the incremental RF properties of the surface material of the body.

A further object of this invention is to provide a portable coupler which can be made to conform to the shape of the body to be tested and therefore yield accurate measurements of the RF properties of the material as it is used or employed.

A feature of this invention is a system for measuring the surface resistance of a sample at microwave frequency, comprising a coupler formed from microstrip and adapted to be disposed adjacent the sample with a portion of the coupler exposed to the sample. Means to apply energy to the microstrip is provided as well as means to adjust the attenuation in the coupler. Means responsive to the exposure of the microstrip to the sample is provided to measure the energy changes produced by the sample.

The above-mentioned and other features and objects of this invention will become more apparent by reference to the following description taken in conjunction with the accompanying drawings, in which:

FIG. 4 is a schematic diagram of a resistance measuring system using the coupler of FIG. 1 or FIG. 3;

FIG. 5 is a block diagram of the resistance measuring system employing direct reading means; and FIG. 6 is a block diagram of the resistance measuring system showing means for measurement of both attenuation and phase shift.

Figure 1:
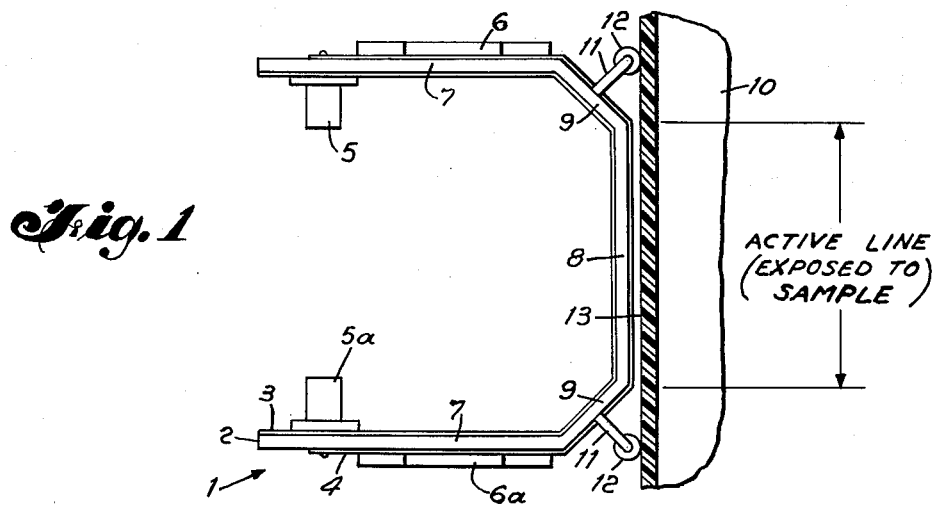
FIG. 1 is a plan view of one embodiment of the coupler of this invention.

Microstrip is a method of microwave transmission comprising, in its simplest form, two conductors, one a "ground conductor" and the other a "line conductor" spaced close together in substantially parallel relation and separated by a dielectric material. The ground conductor, which may be at ground potential or some other given potential, is considerably wider than the line conductor. The distribution of the electric and magnetic fields between the conductors is substantially the same as the distribution between one conductor and the mutual bisecting, perfectly conducting plane of the theoretically perfect two-conductor parallel system. Small variations in size and shape of the line conductor may produce variations in the characteristic impedance of the system, but the field distribution with respect to the ground conductor is not materially disturbed. Likewise, certain variations in the surface of the ground do not materially disturb the field distribution with respect to the surface thereof, since such variations either neutralize each other or do not adversely affect the field distribution between the two conductors. By this system, microwave can be easily propagated by an essentially TEM (transverse electromagnetic) mode along the line-ground conductor system, since the microwaves flow in the region of the concentrated electromagnetic field between the opposed surfaces of the line and ground conductors.

Microstrip may be of the printed circuit type. The conductive layer may be applied to the dielectric in the form of conductive paint or ink, or the conductive material may be chemically deposited, sprayed through a stencil or dusted onto selected prepared surfaces of the dielectric according to known printed circuit techniques. Conductive strips may be applied to the dielectric by appropriate adhesive material. The conductive material may also be electrodeposited on the dielectric.

While the assumption is usually made that microstrip propagates in essentially a TEM mode, the composite dielectric imposes the requirement for a qualifying term. The E field is mainly confined to the dielectric region, but sufficient fringe field components exist above and to the sides of the strip to permit absorption by a card placed at the air-dielectric interface in the plane of the strip. Coupling tests made on various arrangements of microstrip with dielectric thickness as large as one-eighth inch at frequencies to 10,000 mc. indicate a rapid decay of the field beyond about one-half inch from the edge of the strip in the plane of the interface. Therefore, it may be said that all parts of the attenuator card extending beyond that point are relatively ineffective in contributing additional RF absorption.

Microwave frequency attenuators for microstrip transmission lines usually take the form of thin resistance cards placed over the strip conductor. The amount of attenuation resulting from this type of attenuator depends upon the surface resistivity of the card, the spacing between the card and the strip, the length of the card and the width of the card.

Figure 2:
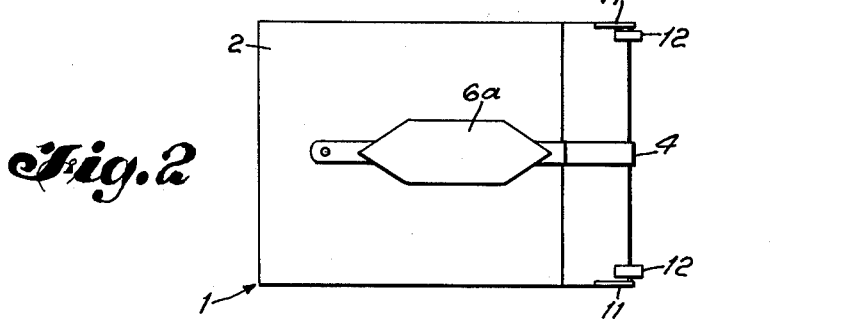
FIG. 2 is a side elevation view of the embodiment of FIG. 1.

Referring now to FIGS. 1 and 2, the coupler 1 is composed of microstrip which consists of a dielectric material 2, disposed between a ground conductor 3 and a line conductor 4. For illustrative purposes the thicknesses of the ground conductor 3 and the line conductor 4 are shown much greater than would normally be the case. Coaxial chassis jacks 5, 5a coupled to the ground conductor 3 and the line conductor 4 are shown for connection by coaxial line to units of the resistance measuring equipment as will be described later on. Attenuator cards 6 are disposed over portions of the line conductor 4 to adjust the characteristics of the coupler 1.

The coupler 1 is formed in a substantially U-shaped member composed of two straight parallel sides 7, 7 and a flat, straight active portion 8 at right angles to the sides 7, 7 and connected thereto by segments 9, 9 angularly disposed to sides 7, 7 with the ground conductor 3 inside the U and the line conductor 4 on the outside thereof. The desired spacing between the coupler 1 and the sample material 10 is maintained by four rods 11 which are connected at one end to segments 9 and at the other end to roller 12. Thus the coupler 1 can be rolled along the sample material 10 during test and while maintaining accurate spacing between the coupler 1 and the sample material 10. The coupler 1 is spaced close to the sample material 10 which is shown as a portion of a much larger apparatus or member, with the exposed, active portion 8 of the coupler 1 being disposed adjacent to the surface 13 of the sample 10. The entire device is mounted on a frame (not shown) so that the coupler 1 can be carried to the sample to be tested.

Figure 3:
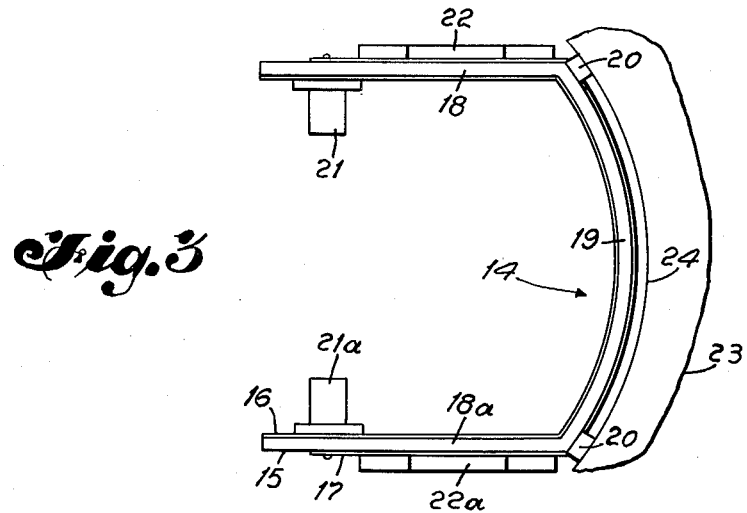
FIG. 3 is a plan view of a second embodiment of the coupler.

Referred now to FIG. 3, a second embodiment of the coupler of this invention is shown adapted for use with curved or irregular surfaces. The coupler 14 is composed of microstrip which consists of a dielectric material 15, a ground conductor 16 and a line conductor 17, and is formed into a substantially U-shaped member having two straight, substantially parallel sides 18 and 18a and a curved base section 19 connecting the two sides 18 and 18a. Sides 18 and 18a do not have to be parallel but are more conveniently made in this manner. Four spacer blocks 20 are attached to the curved base section 19. Chassis jacks 21 and 21a are connected to sides 18 and 19 for coupling to coaxial line. As before, attenuator cards 22 and 22a are disposed on the line conductor segments on sides 18 and 19 to adjust the characteristics of the microstrip line. The active, exposed, curved base portion 20 of the coupler 14 is placed adjacent a sample material 23. The curved surface 24 is maintained in substantially parallel alignment with the curved base 19 by spacer blocks 20.

The dielectric material 15 may be composed of a thermoplastic material. Then, when the surface resistance of a curved body is to be tested, the coupler may be pressed against the body and heat applied to the base 20 to soften it and mold to the curve of the body. When cool, the thermoplastic material and the conductors of the base 20 will be molded to match the contours of the curved body to be examined. Measurement can be carried out as described below which will yield highly accurate results since the curve of the measuring device exactly matches the curve of the body being measured. An additional advantage is the reusable feature of this coupler. After a curved body has been tested, the coupler can be molded to the shape of other curved or irregularly shaped bodies as required. The dielectric material 15 may alternatively be composed of a flexible material, such as, low loss silicone rubber, thin polyethylene, or similar membranes on which conductors can be formed.

In FIG. 4 is shown a resistance measuring system utilizing the coupler. A microwave generator 25 generates a signal which is coupled to the input coaxial connector of the coupler 1, indicated in schematic form, by a coaxial pad or attenuator 26 through the coaxial line 27. The microwave signal in coaxial line 27 branches at junction 28 and travels through attenuators 26 and 29. The signal traveling through attenuator 26 passes through chassis jack 5, shown schematically, to line conductor 4 and past attenuator card 6 into and across the active portion 9 of the coupler 1, through the second attenuator card 6a, and out of the microwave coupler 1 through the second chassis jack 5a. An attenuator 30 couples the output of the coupler 1 into a crystal detector 31. The attenuator 29 couples the junction 28 to a crystal detector 32. A shield can 33 encloses the circuit elements described with the exception of the generator 25 and the exposed portion 9 of the coupler 1 that is to be held closely adjacent the sample material to be tested. Attenuator 26 matches the impedance of the generator 25 to the microwave coupler 1 and attenuator 30 matches the impedance of the coupler 1 to the crystal rectifier 31. Attenuator 29 matches the impedance of generator 25 to the crystal detector 32. Thus pulling of frequency or phase shift of the generator is prevented.

The outputs of crystal detectors 31 and 32 are connected to a bridge circuit enclosed in a shield can indicated by the broken line 34. The bridge circuit consists of fixed load resistors 35, 36 and a variable resistor or potentiometer 37. The output of crystal detector 31 is coupled to resistor 35 and one end of variable resistor 37. The output of crystal detector 32 is coupled to resistor 36 and the other end of variable attenuator 37. A D.C. voltage is developed across each load resistor 35 and 36. The wiper arm 38 of the variable resistor 37 is coupled to an external D.C. meter 39 to indicate a null position when the bridge is in balance with no sample material adjacent the coupler 1. The position of the wiper arm 38 can be appropriately calibrated to indicate the D.C. resistance of the sample test material when it is brought adjacent the coupler 1.

FIG. 5 is a block diagram showing an alternate resistance measuring system using the coupler of this invention, the alternate combination being with a direct reading meter, rather than a bridge circuit. Here a microwave generator 40 is connected to the coupler 1 in the manner described before and the output of coupler 1 is coupled into a crystal detector 41. The signal detected by the crstal detector 41 is passed into a meter 42 where the amount of the attenuation due to the normal circuitry in the absence of the sample is determined. The sample material 43 is then placed adjacent the coupler 1 and the difference in reading of meter 42 indicates the attenuation due to the surface resistance of the sample 43.

The measurement of phase shift as well as surface resistance in a sample material utilizing the coupler of this invention can be accomplished by measuring the unbalance of the output signal relative to some fixed portion of the input signal where no change in signal amplitude results. In order to use the microwave coupler as a phase measuring device, that is, as a way of measuring the localized phase shift through a portion of material under test, it is necessary to tap off a small sample of the incident signal in the coupler itself and compare it with the signal that would be delivered to the detector by using a similar tap off device. The tap off device would either be a directional coupler, an arrangement of probes, a branch guide coupler, any well known version of a cross guide coupler or a Bethe hole coupler. The signals picked up from the input and output arms would then be compared in a null meter which could be set at some initial point to give a null using the input and output signals in the absence of the sample as a zero reference base. Then, as the device itself is moved over the sample, any variation in phase across the microstrip test portion would result in an unbalance of the initial setting.

In some cases it may be necessary to actually measure both amplitude and phase shift of the material under test, in which case, for measuring the attenuation of the material, it would be necessary to set up a detector circuit which would be insensitive to phase variation, or which can have the phase variations balanced out for each reading.

FIG. 6 shows an embodiment of the resistance measuring system using phase shift detecting means combined with the attenuation detecting means. There is shown microwave generator 44 connected by coaxial cable 45 to the input of microwave coupler 1 in the manner previously described. The output of coupler 1 is connected by coaxial cable 46 to an attenuation detector 47 which may be a crystal detector as described above, the output of which is connected to meter 48. This portion of the system operates in the manner described for the embodiment of FIG. 5. In addition, phase detector 49 is connected by leads 50 and 51 to the input and output terminals of the coupler 1. A phase meter 52 is connected to phase detector 49.

In operation a null point is established in the absence of signal. Then, the coupler 1 is placed adjacent to a sample (not shown). The variation from null is a measure of the phase shift in the microwave signal due to the sample.

Whereas other devices known in the art have used a reflection technique in measuring microwave absorption, this invention uses an absorption technique. This resistance measuring system measures the attenuation by the sample material of the wave that is being propagated along the microstrip adjacent to the sample and does not depend on any reflections from the surface of the sample. The propagation is essentially in the TEM mode with the E and H plane vectors of the incident signal traveling with a direction of propagation parallel to the surface under test. Thus, this invention is based on an application of microstrip propagation phenomena rather than on transmission line or closed medium propagation as in a coaxial line or waveguide system.

This system uses the open line which is available only on microstrip, since normally the line-above-ground is not used for propagating microwave signals. Propagation along a microstrip line is such that the microstrip is sensitive to any absorbing medium placed in close proximity to the microstrip itself. This is completely different and distinct from propagation within a coaxial line or hollow waveguide which is insensitive to any attenuating medium placed outside the transmission guide. Coaxial line and hollow waveguides are not constructed in materials so thin that propagation is through the wall as a result of penetration phenomena. In fact, this is specifically avoided.

The resistance measuring system is a means to permit non-destructive tests to be made on a sample of resistive or dielectric material in place on a completed structure, outside of laboratory conditions so that the attenuation or phase shift of the specific portion of the material under examination or the phase shift of this material can be measured. The attenuation is measured by a reduction in the amplitude of the output, the degree of sensitivity necessary in the detector being dependent upon the amount of attenuation that is being measured.

This resistance measuring system does not require any specific sample to be extracted from the whole of the unknown medium or material. The coupler itself can be brought up to the unknown material and then examined by bridge unbalance or by direct measurement as described above. The use of a bridge in itself is not essential to the operation of the resistance measuring device; rather, it can be used with almost any type of detector. The essential feature of the resistance measuring device is that it is a microstrip directional coupler very closely coupled to the material under test so that the attenuation and phase shift characteristics of the unknown material form a major contribution to the amount of energy that is transmitted or absorbed in the directional coupler. The measuring surface of the coupler may take any form but preferably conforms to the shape of the material to be tested.

While I have described above the principles of my invention with specific apparatus, it is to be clearly understood that this description is made only by way of example and not as a limitation to the scope of my invention as set forth in the objects thereof and in the accompanying claims.

I claim:

1. A system for measuring the characteristics of a material at microwave frequencies comprising a coupler having a first conductor, a second conductor wider than said first conductor, a layer of dielectric material supporting said second conductor in substantially spaced relation to said first conductor, said dielectric material and said first and second conductors being disposed in first and second substantially parallel segments, and a third segment connecting said first segment to said second segment at adjacent ends thereof, said second conductor forming continuous member along the inside of said coupler and said first conductor forming a continuous member on the outside of said coupler the transmission path of said coupler being parallel to the long axes of the first conductors of all said segments, and said third segment coupling the transmission paths of said first and second segments said coupler being adapted to be disposed adjacent the surface of the material with said third segment exposed thereto, said third segment having the shape of the surface to be tested, means for spacing said coupler from said surface at a predetermined distance and maintaining said spacing when said coupler is moved about said surface, a source of energy coupled to said first and second conductors, and means responsive to the exposure of said coupler to the material to measure the change in said energy produced by the material.

2. A system for measuring the characteristics of a material at microwave frequencies according to claim 1 wherein said dielectric material is thermoplastic whereby said third segment may be formed to a desired shape.

3. A microwave coupler adapted to be disposed adjacent the surface of a material to be tested comprising a first conductor, a second conductor wider than said first conductor, a layer of dielectric material supporting said second conductor in substantially spaced relation to said first conductor, said dielectric material and said first and second conductors being disposed in first and second substantially parallel segments, and a third segment connecting said first segment to said second segment at adjacent ends thereof, said second conductor forming a continuous member along the inside of said coupler and said first conductor forming a continuous member on the outside of said coupler, the transmission path of said coupler being parallel to the long axis of the first conductors of all said segments, and said third segment coupling the transmission paths of said first and second segments, said third segment having the shape corresponding to the surface to be tested, means for spacing said coupler from said surface at a predetermined distance and maintaining said spacing when said coupler is moved about said surface and means to couple a source of energy to said coupler.

4. A microwave coupler according to claim 3 wherein said third segment further comprises a first flat section substantially transverse to said first and second segments, and second and third sections angularly disposed to said first section and coupling said first section to said first and second segments.

5. A microwave coupler according to claim 3 wherein said dielectric material is thermoplastic whereby said third segment may be formed to a desired shape.

6. A microwave coupler according to claim 3 wherein said dielectric material is flexible whereby said third segment may be bent to a desired shape.

7. A system for measuring the characteristics of a material at microwave frequency comprising a coupler having a first conductor, a second conductor wider than said first conductor, a layer of dielectric material supporting said second conductor in substantially parallel spaced relation to said first conductor, said coupler being adapted to be disposed adjacent the surface of the sample with a portion of said first conductor exposed thereto, said adjacent portion having the shape of the surface of the material to be tested, means for spacing said coupler from said surface at a predetermined distance and maintaining said spacing when said coupler is moved about said surface a signal generator coupled to said first and second conductors, means coupling the output of said signal generator to the input of said coupler to propagate energy in the TEM mode in the coupler adjacent said sample surface, a first detector coupled to the output of said coupler, a bridge circuit, means coupling the output of said first detector to one input of said bridge circuit, a second detector coupling the output of said signal generator to another input of said bridge circuit, means to balance the outputs of said first and second detectors and indicating means coupled to the output of said balancing means whereby the surface resistance of the material is measured.

8. A system for measuring the characteristics of a material at microwave frequency comprising a coupler in the form of a U having a first conductor, a second conductor wider than said first conductor, a layer of dielectric material supporting said second conductor in substantially parallel spaced relation to said first conductor, said second conductor being disposed on the inside of said coupler and said first conductor being disposed on the outside of said coupler, said coupler being adapted to be disposed adjacent the surface of the material with a portion of said first conductor exposed thereto, said adjacent portion having the shape of the surface of the material to be tested, means for spacing said coupler from said surface at a predetermined distance and maintaining said spacing when said coupler is moved about said surface a source of energy coupled to said first and second conductors to propagate energy in the TEM mode in the coupler adjacent said sample surface, detection means coupled to said coupler, indicating means connected to the output of said detecting means, a phase detector, and means coupling said phase detector to the input and output of said detector whereby the phase shift in the change in energy produced by the proximity of the material to said coupler is measured and indicated on said indicating means.

References Cited in the file of this patent

UNITED STATES PATENTS

| | | |
|---|---|---|
| 2,691,760 | Saad | Oct. 12, 1954 |
| 2,721,312 | Grieg et al. | Oct. 18, 1955 |
| 2,746,015 | Alsberg | May 15, 1956 |
| 2,874,276 | Dukes et al. | Feb. 17, 1959 |
| 2,901,709 | Fitzmorris | Aug. 25, 1959 |
| 2,961,621 | Tanenbaum et al. | Nov. 22, 1960 |
| 3,079,551 | Walker | Feb. 26, 1963 |
| 3,079,552 | Walker | Feb. 26, 1963 |

FOREIGN PATENTS

| | | |
|---|---|---|
| 1,102,199 | France | Oct. 18, 1955 |
| 935,014 | Germany | Nov. 10, 1955 |

OTHER REFERENCES

Kostriza: "Microstrip Components" Proceedings of the IRE, December 1952, pp. 1658–1663.

Patrick: "Flexible Strip Transmission Line" IBM Technical Disclosure Bulletin, vol. 2, No. 6, April 1960, pp. 35, 36.

IRE Transactions on Microwave Theory and Techniques, vol. MTT–3, March 1955, No. 2, pp. 30, 39.